(12) United States Patent
Varaprasad et al.

(10) Patent No.: US 8,993,134 B2
(45) Date of Patent: Mar. 31, 2015

(54) ELECTRICALLY CONDUCTIVE UNDERLAYER TO GROW FEPT GRANULAR MEDIA WITH (001) TEXTURE ON GLASS SUBSTRATES

(75) Inventors: Bollapragada Varaprasad, Tsukuba (JP); Yukiko Takahashi, Tsukuba (JP); Kazuhiro Hono, Ibaraki (JP); Antony Ajan, Santa Clara, CA (US); Hua Yuan, Fremont, CA (US); Alexander S. Chernyshov, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 244 days.

(21) Appl. No.: 13/537,379

(22) Filed: Jun. 29, 2012

(65) Prior Publication Data
US 2014/0335376 A1 Nov. 13, 2014

(51) Int. Cl.
| | | |
|---|---|---|
| G11B 5/66 | (2006.01) | |
| G11B 5/73 | (2006.01) | |
| G11B 5/84 | (2006.01) | |
| G11B 5/851 | (2006.01) | |

(52) U.S. Cl.
CPC .............. *G11B 5/8404* (2013.01); *G11B 5/7325* (2013.01); *G11B 5/851* (2013.01); *Y10T 428/1121* (2013.01)
USPC .......................................... 428/831; 427/131

(58) Field of Classification Search
USPC .................. 428/831, 831.2, 832; 427/131
See application file for complete search history.

(56) References Cited

U.S. PATENT DOCUMENTS

| | | |
|---|---|---|
| 4,780,366 A | 10/1988 | Nishimatsu et al. |
| 5,866,227 A | 2/1999 | Chen et al. |
| 6,013,161 A | 1/2000 | Chen et al. |
| 6,063,248 A | 5/2000 | Bourez et al. |
| 6,068,891 A | 5/2000 | O'Dell et al. |
| 6,086,730 A | 7/2000 | Liu et al. |
| 6,099,981 A | 8/2000 | Nishimori |
| 6,103,404 A | 8/2000 | Ross et al. |
| 6,117,499 A | 9/2000 | Wong et al. |
| 6,136,403 A | 10/2000 | Prabhakara et al. |
| 6,143,375 A | 11/2000 | Ross et al. |
| 6,145,849 A | 11/2000 | Bae et al. |
| 6,146,737 A | 11/2000 | Malhotra et al. |
| 6,149,696 A | 11/2000 | Jia |
| 6,150,015 A | 11/2000 | Bertero et al. |
| 6,156,404 A | 12/2000 | Ross et al. |
| 6,159,076 A | 12/2000 | Sun et al. |

(Continued)

FOREIGN PATENT DOCUMENTS

WO 2011087007 7/2011

OTHER PUBLICATIONS

Zhang et al., "L10-ordered high coercivity (FePt)Ag—C granular thin films for perpendicular recording," J. Magn. Mag. Matl., vol. 322, Apr. 2010, pp. 2658-2664.*
International Search Report and Written Opinion dated Dec. 2, 2013 for International Application No. PCT/US13/47397 9 pages.

(Continued)

*Primary Examiner* — Holly Rickman (57) ABSTRACT

A perpendicular magnetic recording medium, comprising: a substrate; a buffer layer deposited in a first orientation on top of the substrate; an underlayer deposited in a second orientation on top of the buffer layer, the underlayer comprising an electrically conductive oxide; and a magnetic recording layer deposited on top of the underlayer and having an axis of magnetic anisotropy substantially perpendicular to the surface thereof.

25 Claims, 8 Drawing Sheets

Out of plane TEM micrograph of FexPt50 on MgTiOx underlayer

(56) References Cited

U.S. PATENT DOCUMENTS

| | | |
|---|---|---|
| 6,164,118 A | 12/2000 | Suzuki et al. |
| 6,200,441 B1 | 3/2001 | Gornicki et al. |
| 6,204,995 B1 | 3/2001 | Hokkyo et al. |
| 6,206,765 B1 | 3/2001 | Sanders et al. |
| 6,210,819 B1 | 4/2001 | Lal et al. |
| 6,216,709 B1 | 4/2001 | Fung et al. |
| 6,221,119 B1 | 4/2001 | Homola |
| 6,248,395 B1 | 6/2001 | Homola et al. |
| 6,261,681 B1 | 7/2001 | Suekane et al. |
| 6,270,885 B1 | 8/2001 | Hokkyo et al. |
| 6,274,063 B1 | 8/2001 | Li et al. |
| 6,283,838 B1 | 9/2001 | Blake et al. |
| 6,287,429 B1 | 9/2001 | Moroishi et al. |
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,482,330 B1 | 11/2002 | Bajorek |
| 6,482,505 B1 | 11/2002 | Bertero et al. |
| 6,500,567 B1 | 12/2002 | Bertero et al. |
| 6,511,761 B1 | 1/2003 | Tanahashi et al. |
| 6,528,124 B1 | 3/2003 | Nguyen |
| 6,548,821 B1 | 4/2003 | Treves et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,628,466 B2 | 9/2003 | Alex |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,730,420 B1 | 5/2004 | Bertero et al. |
| 6,743,528 B2 | 6/2004 | Suekane et al. |
| 6,759,138 B2 | 7/2004 | Tomiyasu et al. |
| 6,778,353 B1 | 8/2004 | Harper |
| 6,795,274 B1 | 9/2004 | Hsieh et al. |
| 6,855,232 B2 | 2/2005 | Jairson et al. |
| 6,857,937 B2 | 2/2005 | Bajorek |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,045,215 B2 | 5/2006 | Shimokawa |
| 7,070,870 B2 | 7/2006 | Bertero et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,147,790 B2 | 12/2006 | Wachenschwanz et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,229,266 B2 | 6/2007 | Harper |
| 7,239,970 B2 | 7/2007 | Treves et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B1 | 1/2008 | Harper et al. |
| 7,329,114 B2 | 2/2008 | Harper et al. |
| 7,375,362 B2 | 5/2008 | Treves et al. |
| 7,420,886 B2 | 9/2008 | Tomiyasu et al. |
| 7,425,719 B2 | 9/2008 | Treves et al. |
| 7,471,484 B2 | 12/2008 | Wachenschwanz et al. |
| 7,498,062 B2 | 3/2009 | Calcaterra et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,569,490 B2 | 8/2009 | Staud |
| 7,597,792 B2 | 10/2009 | Homola et al. |
| 7,597,973 B2 | 10/2009 | Ishiyama |
| 7,608,193 B2 | 10/2009 | Wachenschwanz et al. |
| 7,632,087 B2 | 12/2009 | Homola |
| 7,656,615 B2 | 2/2010 | Wachenschwanz et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,768 B2 | 6/2010 | Ishiyama |
| 7,755,861 B1 | 7/2010 | Li et al. |
| 7,758,732 B1 | 7/2010 | Calcaterra et al. |
| 7,833,639 B2 | 11/2010 | Sonobe et al. |
| 7,833,641 B2 | 11/2010 | Tomiyasu et al. |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,983,003 B2 | 7/2011 | Sonobe et al. |
| 7,993,497 B2 | 8/2011 | Moroishi et al. |
| 7,993,765 B2 | 8/2011 | Kim et al. |
| 7,993,766 B2 | 8/2011 | Sun et al. |
| 7,998,912 B2 | 8/2011 | Chen et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,206,789 B2 | 6/2012 | Suzuki |
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,298,609 B1 | 10/2012 | Liew et al. |

(56) References Cited

U.S. PATENT DOCUMENTS

| | | |
|---|---|---|
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 8,696,404 B2 | 4/2014 | Sun et al. |
| 8,711,499 B1 | 4/2014 | Desai et al. |
| 8,743,666 B1 | 6/2014 | Bertero et al. |
| 8,758,912 B2 | 6/2014 | Srinivasan et al. |
| 8,787,124 B1 | 7/2014 | Chernyshov et al. |
| 8,787,130 B1 | 7/2014 | Yuan et al. |
| 8,791,391 B2 | 7/2014 | Bourez |
| 8,795,765 B2 | 8/2014 | Koike et al. |
| 8,795,790 B2 | 8/2014 | Sonobe et al. |
| 8,795,857 B2 | 8/2014 | Ayama et al. |
| 8,800,322 B1 | 8/2014 | Chan et al. |
| 8,811,129 B1 | 8/2014 | Yuan et al. |
| 8,817,410 B1 | 8/2014 | Moser et al. |
| 2002/0060883 A1 | 5/2002 | Suzuki |
| 2003/0022024 A1 | 1/2003 | Wachenschwanz |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2004/0265570 A1 | 12/2004 | Takahashi et al. |
| 2005/0036223 A1 | 2/2005 | Wachenschwanz et al. |
| 2005/0053795 A1* | 3/2005 | Kubota ................. 428/469 |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0263401 A1 | 12/2005 | Olsen et al. |
| 2006/0147758 A1 | 7/2006 | Jung et al. |
| 2006/0181697 A1 | 8/2006 | Treves et al. |
| 2006/0207890 A1 | 9/2006 | Staud |
| 2007/0070549 A1 | 3/2007 | Suzuki et al. |
| 2007/0245909 A1 | 10/2007 | Homola |
| 2008/0075845 A1 | 3/2008 | Sonobe et al. |
| 2008/0093760 A1 | 4/2008 | Harper et al. |
| 2009/0117408 A1 | 5/2009 | Umezawa et al. |
| 2009/0136784 A1 | 5/2009 | Suzuki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0311557 A1 | 12/2009 | Onoue et al. |
| 2010/0143752 A1 | 6/2010 | Ishibashi et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1* | 6/2012 | Seki et al. ................. 428/832.1 |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |

(56) References Cited

U.S. PATENT DOCUMENTS

| | | |
|---|---|---|
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |
| 2014/0151360 A1 | 6/2014 | Gregory et al. |
| 2014/0234666 A1 | 8/2014 | Knigge et al. |

OTHER PUBLICATIONS

Zhang et al., "L10-ordered high coercivity (FePt)Ag—C granular thin films for perpendicular recording", Journal of Magnetism and Magnetic Materials vol. 322, Apr. 8, 2010, pp. 2658-2664.

Notification of Trans. of International Preliminary Report on Patentability dated Jun. 6, 2014 for International Application No: PCT/US13/47397 1-7 pages.

* cited by examiner

Figure 1 (prior art) XRD micrograph of (Fe₅₀Pt₅₀)₈₀Ag₁₀-C₁₀ with MgO as underlayer

Figure 5 XRD micrograph of $(Fe_{50}Pt_{50})_{90}Ag_{10}$-$C_{x\,vol\%}$ on $MgTiO_x$ underlayer Figure 6 Magnetization curves of $(Fe_{50}Pt_{50})_{90}Ag_{10}$-$C_{x\,vol\%}$ on $MgTiO_x$ underlayer Figure 7 Out of plane TEM micrograph of (Fe₅₀Pt₅₀)₉₀Ag₁₀-C₃₀ on MgTiOₓ underlayer Figure 8 In plane TEM micrograph of (Fe₅₀Pt₅₀)₉₀Ag₁₀-C₃₀ on MgTiOₓ underlayer Figure 9 XRD micrograph of Fe50Pt50 on MgTiOx underlayer Figure 10 Magnetization curves of Fe50Pt50 on MgTiOx underlayer Figure 11 Out of plane TEM micrograph of Fe₅₀Pt₅₀ on MgTiO$_x$ underlayer

Figure 12

ELECTRICALLY CONDUCTIVE UNDERLAYER TO GROW FEPT GRANULAR MEDIA WITH (001) TEXTURE ON GLASS SUBSTRATES

FIELD OF THE INVENTION

The present invention generally relates to magnetoresistive reader devices and, in particular, relates to an electrically conductive underlayer to grow FePt granular media with (001) texture on glass substrates.

BACKGROUND OF THE INVENTION

FePt granular thin films are considered to be suitable candidates for ultrahigh density perpendicular recording media beyond 1 Tbits/in$^2$ due to the high magnetocrystalline anisotropy of the L10⁻FePt phase (~7×107 erg/cc). Since high Ku media has high Hc (larger than current head field), heat assisted magnetic recording (HAMR) is proposed as next generation magnetic recording technology. FePt is one of the candidates for HAMR media due to its Ku. To use FePt as HAMR media, FePt nano-particles should have (001) orientation. Currently, an MgO (001) underlayer is widely used to grow FePt in (001) direction. Although it serves as a proper underlayer, an MgO (001) underlayer still has some drawbacks such as low deposition rates, poor thermal conductivity, high electrical insulation and the production of MgO dust.

SUMMARY OF THE INVENTION

Various embodiments of the subject disclosure overcome the foregoing limitations by providing a perpendicular magnetic recording medium featuring an $MgTiO_x$ underlayer instead of MgO. Since $MgTiO_x$ is electrically conductive (i.e., low resistivity), direct current (DC) sputtering can be used to achieve increases sputtering rates. MgO, on the other hand, has high resistivity, thus requiring radio frequency (RF) sputtering. Additionally, an $MgTiO_x$ underlayer is less expensive and is capable of withstanding higher temperatures than an MgO underlayer.

According to some embodiments, a perpendicular magnetic recording medium, comprises: a substrate; a buffer layer deposited in a first orientation on top of the substrate; an underlayer deposited in a second orientation on top of the buffer layer, the underlayer comprising an electrically conductive oxide; and a magnetic recording layer deposited on top of the underlayer and having an axis of magnetic anisotropy substantially perpendicular to the surface thereof. In some configurations, the oxide is an oxide of an alloy comprising Mg and one or more elements selected from the group consisting of Ti, Zr and Hf. In one embodiment, the oxide comprises between 5 and 35 atomic percent Mg. In another embodiment, the oxide comprises between 15 and 25 atomic percent Mg. By way of example, the oxide may comprise $MgTiO_x$, $MgTiO_2$, $MgZrO_3$, or MgHfO.

According to further embodiments, the above-described perpendicular recording medium may also comprise a second buffer layer deposited on top of the substrate, wherein the second buffer layer comprises NiTa. The NiTa can be deposited on the substrate by way of DC sputtering. In one implementation, the buffer layer may comprise Cr that is deposited in (200) orientation. By way of example, the Cr can be deposited by way of DC sputtering. The underlayer may be deposited on the buffer layer in (001) orientation, for example by way of DC sputtering. The magnetic recording layer can comprise FePtAgC and may be deposited on the underlayer by way of DC co-sputtering.

Additional embodiments are directed toward a method for fabricating a perpendicular magnetic recording medium, comprising depositing a buffer layer on a substrate, depositing an underlayer over the buffer layer (the underlayer comprising an electrically conductive oxide), heating the substrate and deposited layers, and depositing a magnetic recording layer over the underlayer. The oxide can be an oxide of an alloy comprising Mg and one or more elements selected from the group consisting of Ti, Zr and Hf. In some embodiments, the oxide may comprise between 5 and 35 atomic percent Mg. In other embodiments, the oxide may comprise between 15 and 25 atomic percent Mg. The method may further comprise depositing a second buffer layer on the substrate, and modifying a top surface of the second buffer layer prior to depositing the buffer layer. By way of example, modifying the top surface might comprise introducing oxygen for a predetermined amount of time and allowing the top surface to grow Cr in (200) orientation.

According to some embodiments, in the above-described method for fabricating a perpendicular magnetic recording medium, the oxide may comprise $MgTiO_x$. By way of example, the oxide can be $MgTiO_2$. In other embodiments, the oxide comprises $MgZrO_3$. In further embodiments, the oxide is MgHfO. According to some embodiments, the step of depositing the buffer layer comprises depositing Cr on the first buffer layer in (200) orientation. In addition, the step of depositing the magnetic recording layer may comprise depositing FePtAgC on the underlayer by way of DC co-sputtering.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
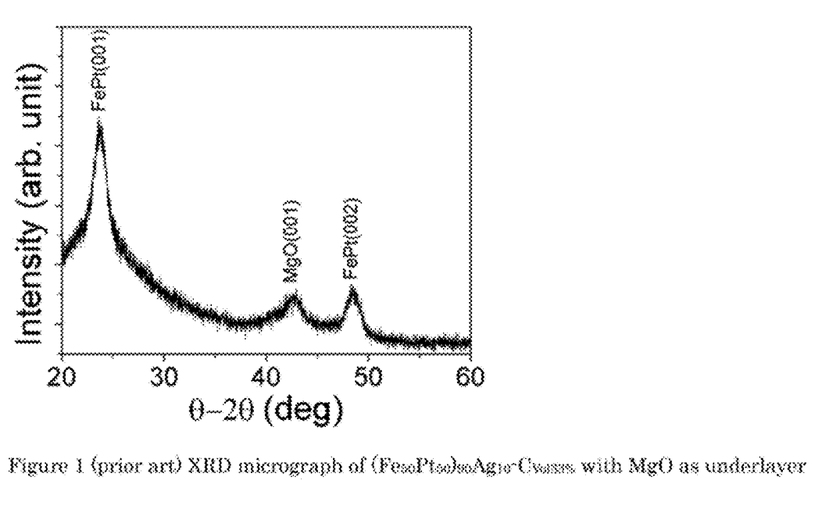
FIG. 1 (prior art) is an XRD micrograph depicting the XRD pattern of $(Fe_{50}Pt_{50})_{90}Ag_{10}$—$C_{Vol33\%}$ having an MgO underlayer.

FIG. 1 (prior art) is an XRD micrograph depicting the XRD pattern of $(Fe_{50}Pt_{50})_{90}Ag_{10}$—$C_{Vol33\%}$ having an MgO underlayer. As the diffraction peaks from (001)MgO, and (001) FePt and (002)FePt are clearly observed, FePt grows in (001) direction. MgO oxide which has a resistance of mega ohms and one has to use radio frequency (RF) sputtering. Whereas MgTiO, has resistance of 400 mΩ/mm enable us to use direct current (DC) sputtering.

FIGS. 2-11 include micrographs depicting example perpendicular magnetic recording medium featuring an $MgTiO_x$ underlayer. In particular, thin film stacks were initially deposited on glass substrates. Next, 100 nm thick NiTa was deposited at room temperature and oxygen introduced for 60 seconds at $1.8\times10^{-3}$ Pa to modify the interface to grow Cr in (200) orientation, which is required to grow $MgTiO_x$ in (001) direction. The optimized sputtering condition of $MgTiO_x$ is: Ar Pressure—3.5 m torr; Power—40 W DC; Target to substrate distance—100 mm; Room temperature deposition. After depositing the underlayers, the substrate was heated to 600° C. and $(FePt)_{90}Ag_{10}$—$C_{Vol33\%}$ was deposited. Structural characterization was then carried out using XRD. Magnetization curves were measured using SQUID VSM from the measurements.

Figure 2:
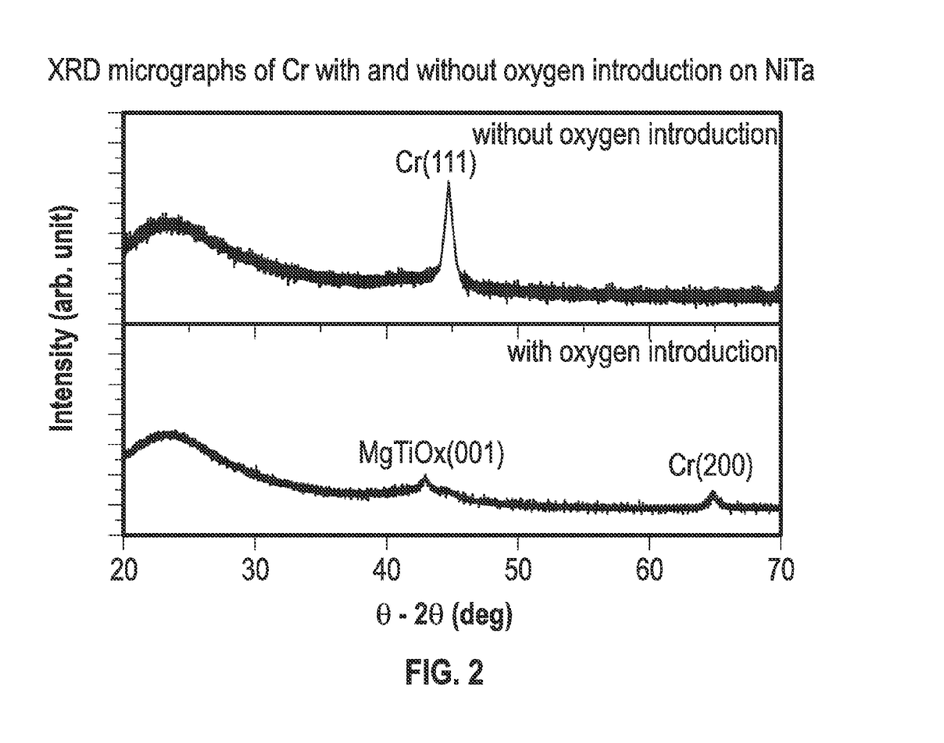
FIG. 2 is an XRD micrograph depicting the XRD patterns of the NiTa/Cr/$MgTiO_x$ underlayer.

FIG. 2 is an XRD micrograph depicting the XRD patterns of the $NiTa/Cr/MgTiO_x$ underlayer. With the introduction of oxygen, the $MgTiO_x$ grows in (001) orientation. Because the Cr layer also shows (001) orientation, the oxygen introduction after the NiTa deposition is effective on the change of Cr orientation from (111) to (200).

Figure 3:
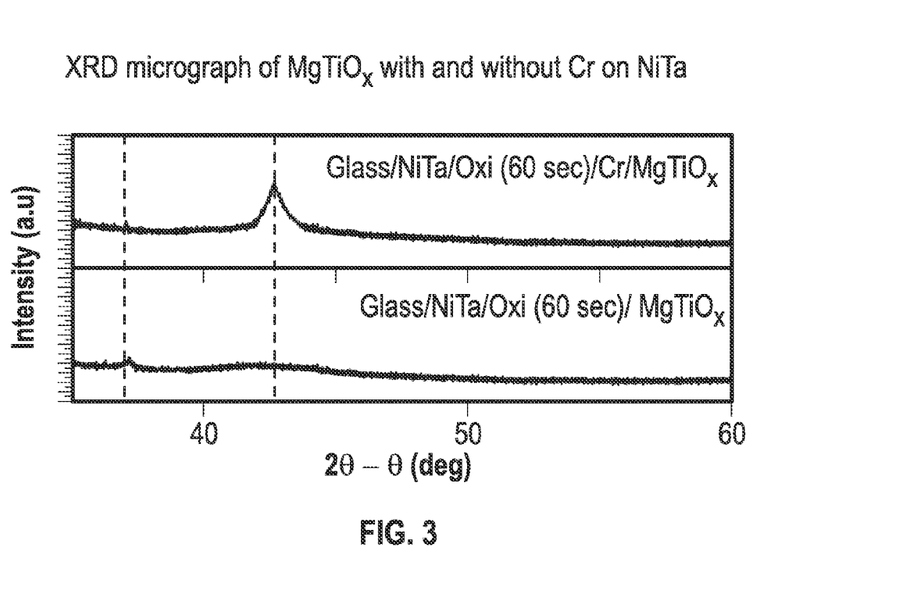
FIG. 3 is an XRD micrograph depicting the XRD patterns of the Cr intermediate layer.

FIG. 3 is an XRD micrograph depicting the XRD patterns of the Cr intermediate layer. This layer is necessary for (001) growth of $MgTiO_x$.

Figure 4:
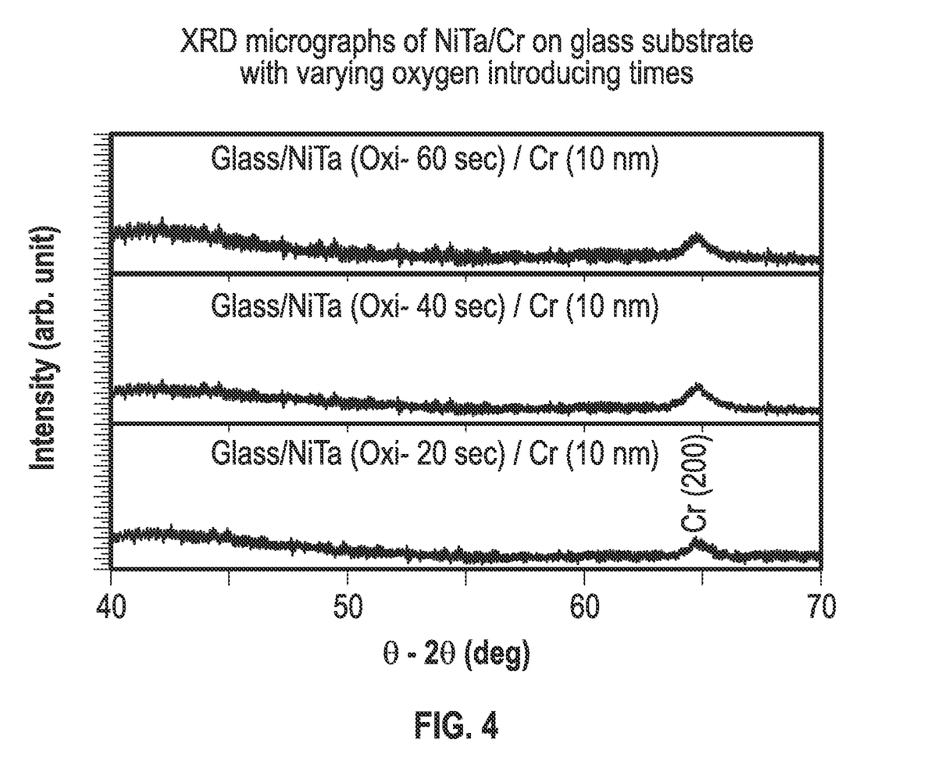
FIG. 4 is an XRD micrograph depicting the XRD patterns of samples with a stack of NiTa/oxidation/Cr.

FIG. 4 is an XRD micrograph depicting the XRD patterns of samples with a stack of NiTa/oxidation/Cr. The time for oxidation was changed from 20 to 60 seconds. All of the films show (001) growth. Since the peak intensity of Cr(200) is highest in the film with the oxidation for 60 sec, this condition may be selected as the optimal condition.

Figure 5:
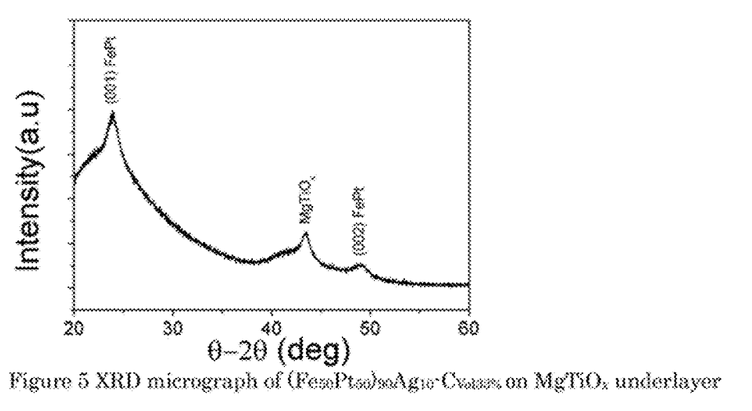
FIG. 5 is an XRD micrograph depicting the XRD pattern of $(Fe_{50}Pt_{50})_{90}Ag_{10}$—$C_{Vol33\%}$ on an $MgTiO_x$ underlayer.

FIG. 5 is an XRD micrograph depicting the XRD pattern of $(Fe_{50}Pt_{50})_{90}Ag_{10}$—$C_{Vol33\%}$ on an $MgTiO_x$ underlayer. Peaks of FePt(001) and FePt(002) are observed.

Figure 6:
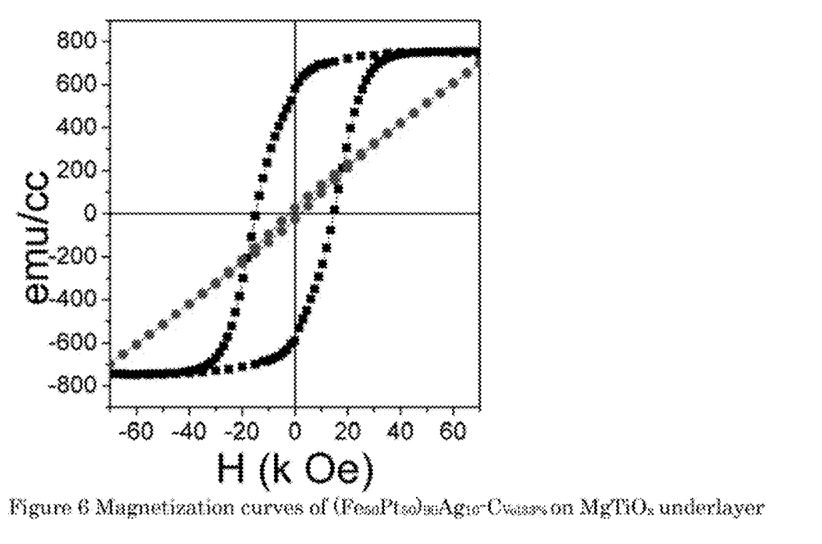
FIG. 6 is a chart depicting the magnetization curves of in-plane (red) and out of plane (black) of the $(Fe_{50}Pt_{50})_{90}Ag_{10}$—$C_{Vol33\%}$ on MgTiO, underlayer.

FIG. 6 is a chart depicting the magnetization curves of in-plane (red) and out of plane (black) of the $(Fe_{50}Pt_{50})_{90}$ $Ag_{10}$—$C_{Vol33\%}$ on $MgTiO_x$ underlayer. It shows strong perpendicular anisotropy and Hc is about 15 kOe.

Figure 7:
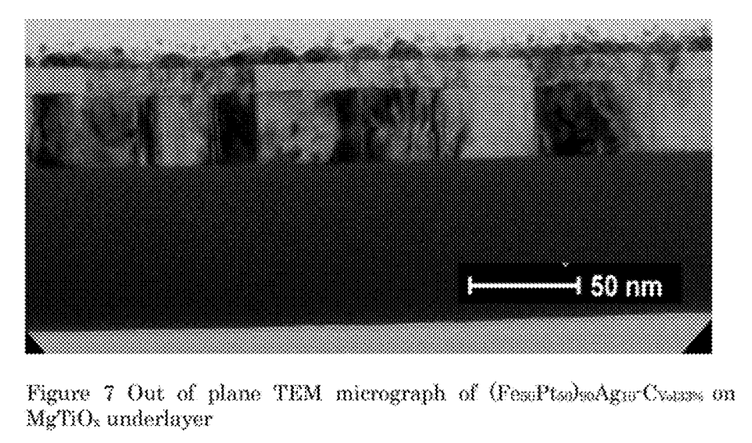
FIGS. 7 and 8 are out-of-plane and in-plane TEM micrographs, respectively, of $(Fe_{50}Pt_{50})_{90}Ag_{10}$—$C_{Vol33\%}$ on an $MgTiO_x$ underlayer.
Figure 8:
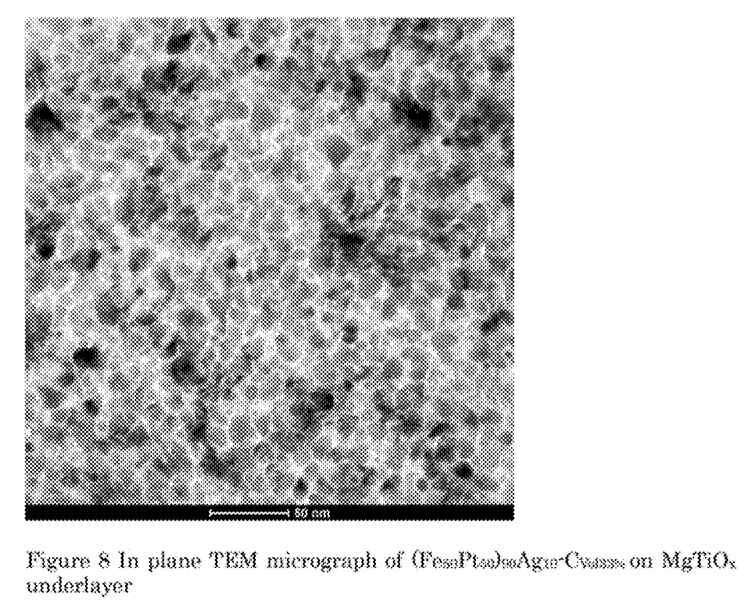

FIGS. 7 and 8 are out-of-plane and in-plane TEM micrographs, respectively, of $(Fe_{50}Pt_{50})_{90}Ag_{10}$—$C_{Vol33\%}$ on an $MgTiO_x$ underlayer. From the out plane observation we can see the layer are smooth and grain to grain correlation between the Cr and $MgTiO_x$.

Figure 9:
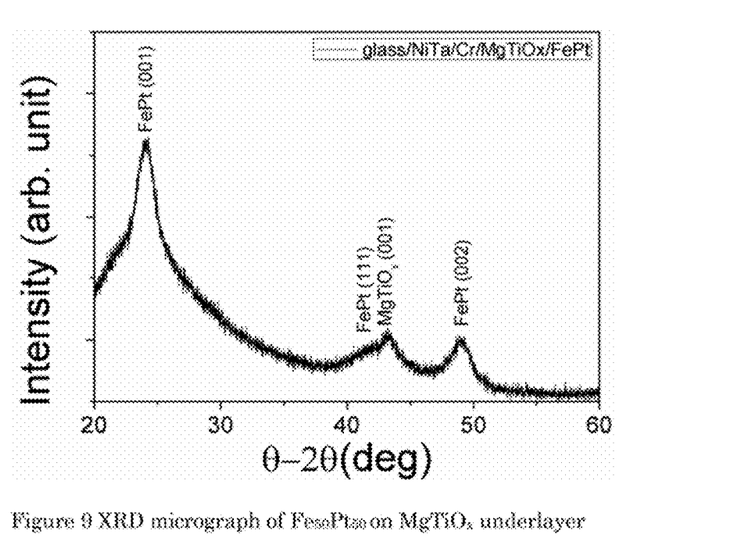
FIGS. 9 and 10 are XRD and magnetization micrographs, respectively, of $Fe_{50}Pt_{50}$ on an $MgTiO_x$ underlayer.
Figure 10:
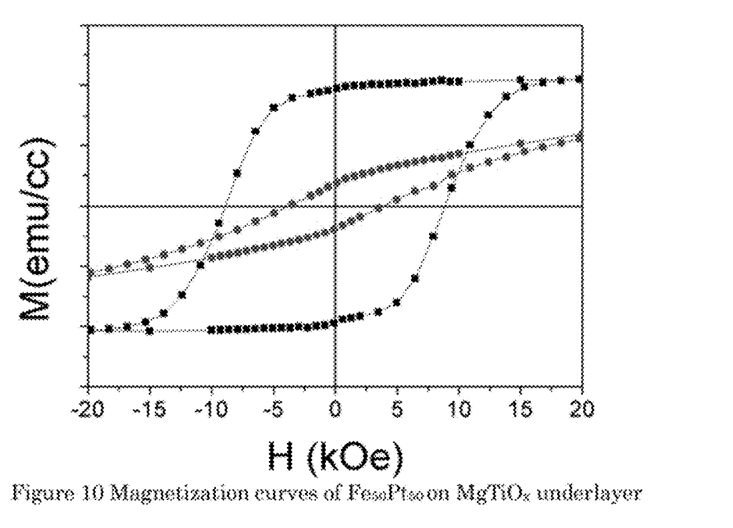

FIGS. 9 and 10 are XRD and magnetization micrographs, respectively, of $Fe_{50}Pt_{50}$ on an MgTiO), underlayer.

Figure 11:
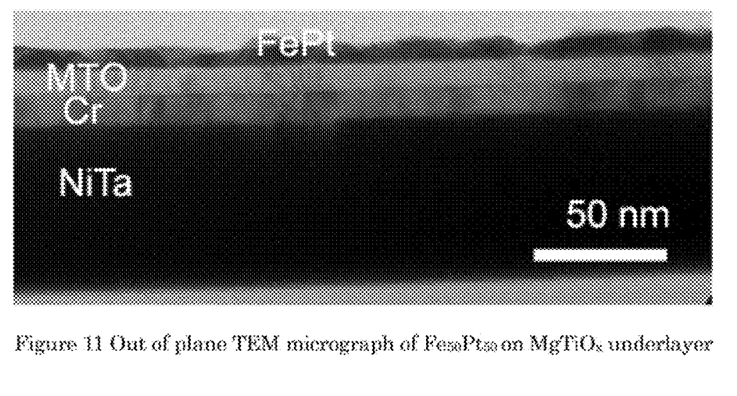
FIG. 11 is an out-of-plane TEM micrographs of $Fe_{50}Pt_{50}$ on an $MgTiO_x$ underlayer.

FIG. 11 is an out-of-plane TEM micrographs of $Fe_{50}Pt_{50}$ on an $MgTiO_x$ underlayer. This shows interconnected FePt grains because of good wetting between FePt and MgTiOx. Accordingly, $MgTiO_x$ is suitable underlayer for HAMR media.

The above example medium show that a conductive $MgTiO_x$ underlayer may be used to grow (001)FePt. Because $MgTiO_x$ is electrically conductive, DC sputtering can be employed. Additionally, good perpendicular anisotropy was observed using the $MgTiO_x$ underlayer.

According to some embodiments, a perpendicular magnetic recording medium comprises a substrate, a buffer layer deposited in a first orientation on top of the substrate, an underlayer deposited in a second orientation on top of the buffer layer, and a magnetic recording layer deposited on top of the underlayer and having an axis of magnetic anisotropy substantially perpendicular to the surface thereof. The underlayer comprises an electrically conductive oxide such as an oxide of an alloy comprising Mg and one or more elements selected from the group consisting of Ti, Zr and Hf. In one embodiment, the oxide comprises between 5 and 35 atomic percent Mg. In another embodiment, the oxide comprises between 15 and 25 atomic percent Mg. In various embodiments, the oxide may comprise $MgTiO_x$, $MgTiO_2$, $MgZrO_3$, or MgHfO.

According to additional embodiments, the above-described perpendicular recording medium may further comprise a second buffer layer deposited on top of the substrate, wherein the second buffer layer comprises NiTa. The NiTa can be deposited on the substrate by way of DC sputtering. In one implementation, the buffer layer may comprise Cr that is deposited in (200) orientation. By way of example, the Cr can be deposited by way of DC sputtering. The underlayer may be deposited on the buffer layer in (001) orientation, for example, by way of DC sputtering. The magnetic recording layer can comprise FePtAgC and may be deposited on the underlayer by way of DC co-sputtering.

Additional embodiments are directed toward a method for fabricating a perpendicular magnetic recording medium, comprising (i) depositing a buffer layer on a substrate, (ii) depositing an underlayer over the buffer layer (the underlayer comprising an electrically conductive oxide), (iii) heating the substrate and deposited layers, and (iv) depositing a magnetic recording layer over the underlayer. The oxide can be an oxide of an alloy comprising Mg and one or more elements selected from the group consisting of Ti, Zr and Hf. In some embodiments, the oxide may comprise between 5 and 35 atomic percent Mg. In other embodiments, the oxide may comprise between 15 and 25 atomic percent Mg. In additional embodiments, the method may further comprise depositing a second buffer layer on the substrate, and modifying a top surface of the second buffer layer prior to depositing the buffer layer. Modifying the top surface might comprise introducing oxygen for a predetermined amount of time and allowing the top surface to grow Cr in (200) orientation.

According to further embodiments of the above-described method for fabricating a perpendicular magnetic recording medium, the oxide may comprise $MgTiO_x$. In some embodiments, the oxide can be $MgTiO_2$. In other embodiments, the oxide might comprise $MgZrO_3$. In further embodiments, the oxide can be MgHfO. According to some embodiments, the step of depositing the buffer layer comprises depositing Cr on the first buffer layer in (200) orientation. In addition, the step of depositing the magnetic recording layer may comprise depositing FePtAgC on the underlayer by way of DC co-sputtering.

In further embodiments, the electrically conductive oxide underlayers described herein can be employed as a spacer for spintronic devices featuring tunneling magnetoresistance.

Figure 12:
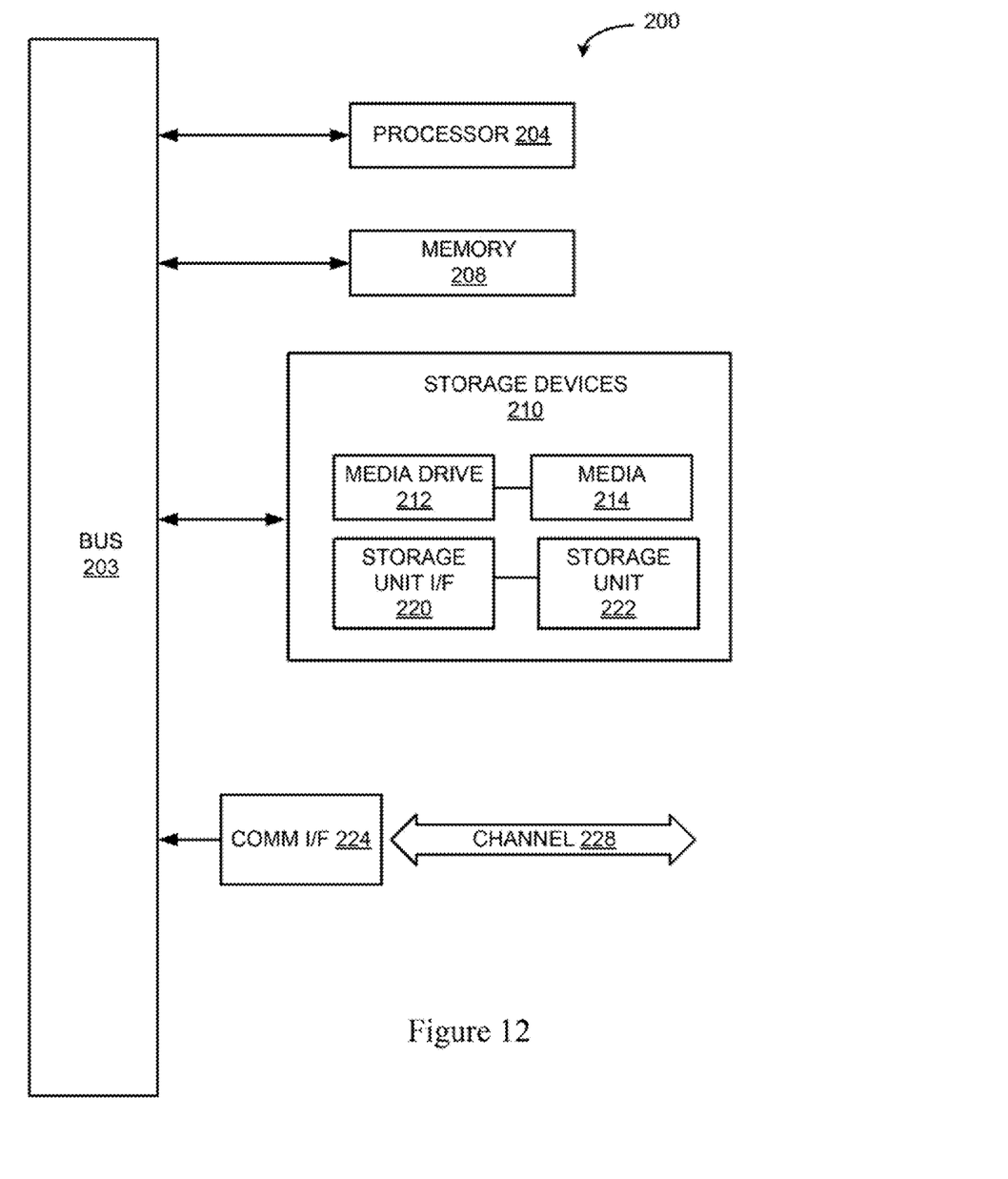
FIG. 12 is a diagram illustrating an exemplary disk drive including a read-write the head that can be created in accordance with some embodiments.

FIG. 12 is a diagram illustrating an exemplary disk drive 200 including a read-write the head 204 that can be created in accordance with some embodiments. Disk drive 200 may include one or more disks to store data. The disks 210 reside on a spindle assembly 208 that is mounted to drive housing 212. Data may be stored along tracks in the magnetic recording layer of one of the disks 210. The reading and writing of data is accomplished with the head 204 that has both read and write elements. The write element is used to alter the properties of the perpendicular magnetic recording layer of disk 210. In some embodiments, the head 204 may have one of the structures depicted in FIG. 1G. Additionally, for some embodiments, the head 204 may have magneto-resistive (MR) or giant magneto-resistive (GMR) elements. In further embodiments, the head 204 may be another type of head, for example, an inductive read/write head or a Hall effect head. In various embodiments, the disk drive 200 may a perpendicular magnetic recording (PMR) drive, and the head 204 may be suitable for perpendicular magnetic recording (PMR). A spindle motor (not shown) rotates the spindle assembly 208 and, thereby, disks 210 to position the head 204 at a particular location along a desired disk track. The position of the head 204 relative to the disks 210 may be controlled by position control circuitry 206.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A perpendicular magnetic recording medium, comprising:
    a substrate;
    a buffer layer deposited in a first orientation on top of the substrate;
    an underlayer deposited in a second orientation on top of the buffer layer, the underlayer comprising an electrically conductive oxide of Mg with one or more of Ti, Zr and Hf, the oxide comprising between 5 and 35 atomic percent Mg; and
    a magnetic recording layer deposited on top of the underlayer and having an axis of magnetic anisotropy substantially perpendicular to the surface thereof.

2. The recording medium of claim 1, wherein the oxide comprises between 15 and 25 atomic percent Mg.

3. The recording medium of claim 1, wherein the oxide is $MgTiO_x$.

4. The recording medium of claim 1, wherein the oxide is $MgTiO_2$.

5. The recording medium of in claim 1, wherein the oxide is $MgZrO_3$.

6. The recording medium of in claim 1, wherein the oxide is MgHfO.

7. The recording medium of claim 1, further comprising a second buffer layer deposited on top of the substrate, wherein the second buffer layer comprises NiTa.

8. The recording medium of claim 7, wherein the NiTa is deposited on the substrate by way of DC sputtering.

9. The recording medium of claim 1, wherein the buffer layer comprises Cr.

10. The recording medium of claim 9, wherein the Cr is deposited in (200) orientation.

11. The recording medium of claim 9, wherein the Cr is deposited by way of DC sputtering.

12. The recording medium of claim 1, wherein the underlayer is deposited on the buffer layer in (001) orientation.

13. The recording medium of claim 12, wherein the underlayer is deposited on the buffer layer by way of DC sputtering.

14. The recording medium of claim 1, wherein the magnetic recording layer comprises FePtAgC.

15. The recording medium of claim 14, wherein the magnetic recording layer is deposited on the underlayer by way of DC co-sputtering.

16. A method for fabricating a perpendicular magnetic recording medium, the method comprising:
    depositing a buffer layer on a substrate;
    depositing an underlayer over the buffer layer, the underlayer comprising an electrically conductive oxide of Mg with one or more of Ti, Zr and Hf, the oxide comprising between 5 and 35 atomic percent Mg;
    heating the substrate and deposited layers; and
    depositing a magnetic recording layer over the underlayer.

17. The method of claim 16, wherein the oxide comprises between 15 and 25 atomic percent Mg.

18. The method of claim 16, further comprising depositing a second buffer layer on the substrate, and modifying a top surface of the second buffer layer prior to depositing the buffer layer.

19. The method of claim 18, wherein modifying the top surface comprises introducing oxygen for a predetermined amount of time and allowing the top surface to grow Cr in (200) orientation.

20. The method of claim 16, wherein the oxide is $MgTiO_x$.

21. The method of claim 16, wherein the oxide is $MgTiO_2$.

22. The method of in claim 16, wherein the oxide is $MgZrO_3$.

23. The method of in claim 16, wherein the oxide is MgHfO.

24. The method of claim 16, wherein depositing the buffer layer comprises depositing Cr on a first buffer layer in (200) orientation.

25. The method of claim 16, wherein depositing the magnetic recording layer comprises depositing FePtAgC on the underlayer by way of DC co-sputtering.

* * * * *